(12) United States Patent
Nazarathy et al.

(10) Patent No.: US 9,735,886 B2
(45) Date of Patent: Aug. 15, 2017

(54) SELF-COHERENT ROBUST SPECTRALLY EFFICIENT OPTICAL TRANSMISSION SYSTEMS

(71) Applicant: Technion Research and Development Foundation LTD., Haifa (IL)

(72) Inventors: Moshe Nazarathy, Haifa (IL); Amos Agmon, Kiryat Tivon (IL); Alex Tolmachev, Karmiel (IL)

(73) Assignee: Technion Research and Development Foundation Ltd., Haifa (IL)

(*) Notice: Subject to any disclaimer, the term of this patent is extended or adjusted under 35 U.S.C. 154(b) by 0 days.

(21) Appl. No.: 14/842,850

(22) Filed: Sep. 2, 2015

(65) Prior Publication Data
US 2016/0065314 A1 Mar. 3, 2016

Related U.S. Application Data

(60) Provisional application No. 62/044,429, filed on Sep. 2, 2014.

(51) Int. Cl.
*H04B 10/06* (2006.01)
*H04B 10/61* (2013.01)
*H04B 10/63* (2013.01)
*H04B 10/64* (2013.01)

(52) U.S. Cl.
CPC ....... *H04B 10/6151* (2013.01); *H04B 10/614* (2013.01); *H04B 10/63* (2013.01); *H04B 10/64* (2013.01)

(58) Field of Classification Search
CPC .. H04B 10/60; H04B 10/611; H04B 10/6162; H04B 10/612; H04B 10/613; H04B 10/6165; H04B 10/6161; H04B 10/6166
USPC ....... 398/202, 203, 204, 205, 206, 207, 208, 398/209, 210, 212, 213, 214, 183, 184, 398/188, 135, 136, 65, 152, 158, 159
See application file for complete search history.

(56) References Cited

U.S. PATENT DOCUMENTS

| | | | |
|---|---|---|---|
| 6,859,568 B2 | 2/2005 | Noe | |
| 9,008,512 B2 | 4/2015 | Nazarathy et al. | |
| 2014/0334831 A1* | 11/2014 | Kawazoe | H04B 10/693 398/210 |
| 2014/0356003 A1* | 12/2014 | Randel | H04B 10/616 398/210 |

OTHER PUBLICATIONS

E. Ip and J. M. Kahn, "Fiber Impairment Compensation Using Coherent Detection and Digital Signal Processing," J. Light. Technol., vol. 28, No. 4, pp. 502-519, Feb. 2010.
A. Agmon, M. Nazarathy, D. M. Marom, A. Tolmachev, R. Killey, P. Bayvel, L. Meder, M. Hübner, W. Meredith, G. Vickers, P. C. Schindler, R. Schmogrow, D. Hillerkuss, W. Freude, C. Koos, and J. Leuthold, "OFDM/WDM PON With Laserless, Colorless 1 Gb/s ONUs Based on Si-PIC and Slow IC," IEEE J. Opt. Commun. Netw., vol. 6, No. 3, pp. 225-237, 2014.
M. Nazarathy and A. Agmon, "Doubling direct-detection data rate by polarization multiplexing of 16-QAM without active polarization control," Opt. Express, vol. 21, No. 26, pp. 31998-32012, 2013.

(Continued)

*Primary Examiner* — Hanh Phan
(74) *Attorney, Agent, or Firm* — Reches Patents

(57) ABSTRACT

Coherent reconstruction of dual polarized data and pilot signals without local oscillator or laser.

16 Claims, 10 Drawing Sheets

(56) References Cited

OTHER PUBLICATIONS

B. Koch, R. Noé, S. Member, V. Mirvoda, and D. Sandel, "Temperature-Insensitive and Two-Sided Endless Polarization Control," Photonics Technol. Lett., vol. 24, No. 22, pp. 2077-2079, 201 and R. G. Rabus, Integrated Ring Resonators. Springer, 2007.
D. G. Rabus, Integrated Ring Resonators. Springer, 2007; Coupled-Resonator Optical Waveguides (CROW).

* cited by examiner

SELF-COHERENT ROBUST SPECTRALLY EFFICIENT OPTICAL TRANSMISSION SYSTEMS

CROSS REFERENCE TO RELATED APPLICATIONS

This application claims priority from U.S. provisional patent 62/044,429 having a filing date of Sep. 2, 2014 which is incorporated herein by reference.

BACKGROUND OF THE INVENTION

In recent years, coherent optical detection (E. Ip and J. M. Kahn, "Fiber Impairment Compensation Using Coherent Detection and Digital Signal Processing," J. Light. Technol., vol. 28, no. 4, pp. 502-519, Feb. 2010) has been deployed on a large scale for high-speed long-haul optical transmission. Despite substantial performance advantages, the complexity and power consumption of coherent optical receivers are prohibitive, precluding their usage in cost-sensitive short-reach applications such as data-centers and their interconnects, as well as optical access networks such as passive optical networks. Currently coherent optical receivers are mainly used in long-haul and regional metro transmission but are uneconomic for cost-sensitive optical communication at short distances (<100 km). The search continues for high-capacity optical transmission methods at short reach, which are "coherent-like", sharing many of the performance advantages of coherent detection, yet at lower complexity, cost and power consumption.

SUMMARY

According an embodiment of the invention there may be provided an optical receiver that may include an extraction circuit, a pilot generator, a first coherent detector and a second coherent detector; wherein the extraction circuit may be configured to (a) receive, from an optical communication link, a received signal that may include first polarized data, second polarized data, a first polarized pilot component, and a second polarized pilot component and (b) extract the first and second polarized pilot components, the first polarized data and the second polarized data; wherein the first and second polarized pilot components belong to a pilot signal that has a pilot frequency that is within a frequency gap formed in a data spectrum that may include frequencies of the first and second polarized data; wherein the first polarized data and the first polarized pilot components are of a first polarization and wherein the second polarized data and the second polarized pilot components are of a second polarization that differs from the first polarization; wherein the pilot generator may be configured to coherently sum the first and second polarized pilot components and to generate first and second reconstructed pilot signals of substantially a same power; wherein the first coherent detector may be configured to receive the first reconstructed pilot signal and the first polarized data and to output at least one first data stream; and wherein the second coherent detector may be configured to receive the second reconstructed pilot signal and the second polarized data and to output at least one second data stream.

The optical receiver may not include a local oscillator.

The optical receiver may not include a laser.

The pilot generator may include a controller that may be configured to detect a difference between powers of the first and second reconstructed pilot signals and to send a feedback signal that reduces the difference.

The pilot generator may include a pair of phase modulators followed by a coupler; wherein the feedback signal may be configured to change a phase shift between the pair of phase modulators in response to the difference between powers of the first and second reconstructed pilot signals.

The pilot generator may be a partial Mach Zehnder Modulator that may include a pair of phase modulators followed by a coupler.

The pair of phase modulators may be configured to operate in a push pull mode.

The extraction circuit may include a polarized de-multiplexer followed by a first filter bank and a second filter bank; wherein the first filter of the first filter bank may be configured to output the first polarized data and a second filter of the first bank filter may be configured to output the first polarized pilot component; and wherein the first filter of the second filter bank may be configured to output the second polarized data and a second filter of the second bank filter may be configured to output the second polarized pilot component.

The first and second data streams may be in phase and quadrature data streams.

The first and second polarizations may be orthogonal to each other.

For example X and Y polarizations.

The frequency gap may be positioned at a center of the data spectrum.

The first and second coherent detectors may be homodyne receiver detectors.

The first and second coherent detectors may be heterodyne receiver detectors.

According an embodiment of the invention there may be provided an optical transceiver that may include an optical receiver and an optical transmitter; wherein the optical receiver may include an extraction circuit, a pilot generator, a first coherent detector and a second coherent detector; wherein the extraction circuit may be configured to (a) receive, from an optical communication link, received signals that may include first polarized data, second polarized data, a first polarized pilot component, and a second polarized pilot component and (b) extract the first and second polarized pilot components, the first polarized data and the second polarized data; wherein the first and second polarized pilot components belong to a pilot signal that has a pilot frequency that is within a frequency gap formed in a data spectrum that may include frequencies of the first and second polarized data; wherein the first polarized data and the first polarized pilot components are polarized by a first polarization and wherein the second polarized data and the second polarized pilot components are polarized by a second polarization that differs from the first polarization; wherein the pilot generator may be configured to coherently sum the first and second polarized pilot components and to generate first and second reconstructed pilot signals of substantially a same power; wherein the first coherent detector may be configured to receive a first portion of the first reconstructed pilot signal and the first polarized data and to output first and second data streams that form the first polarized data; wherein the second coherent detector may be configured to receive a first portion of the second reconstructed pilot signal and the second polarized data and to output first and second data streams that form the second polarized data; wherein the optical transmitter may be configured to receive four data streams, a second portion of the first reconstructed pilot signal and a second portion of the second reconstructed pilot signal and to output an output signal that represents the four data streams.

The optical transceiver may not include a local oscillator.

The optical transceiver may not include a laser.

The pilot generator may include a controller that may be configured to detect a difference between powers of the first and second reconstructed pilot signals and to send a feedback signal that reduces the difference.

The pilot generator may include a pair of phase modulators followed by a coupler; wherein the feedback signal may be configured to change a phase shift between the pair of phase modulators in response to the difference between powers of the first and second reconstructed pilot signals.

The pilot generator may be a partial Mach Zehnder Modulator that may include a pair of phase modulators followed by a coupler.

The pair of phase modulators may be configured to operate in a push pull mode.

The extraction circuit may include a polarized de-multiplexer followed by a first filter bank and a second filter bank; wherein the first filter of the first filter bank may be configured to output the first polarized data and a second filter of the first bank filter may be configured to output the first polarized pilot component; and wherein the first filter of the second filter bank may be configured to output the second polarized data and a second filter of the second bank filter may be configured to output the second polarized pilot component.

The first and second data streams may be in phase and quadrature data streams.

The first and second polarizations may be orthogonal to each other.

For example—X and Y polarizations.

The frequency gap may be positioned at a center of the data spectrum.

The first and second coherent detectors may be homodyne receiver detectors.

The first and second coherent detectors may be heterodyne receiver detectors.

According an embodiment of the invention there may be provided a method for self-coherent reception, the method may include receiving, by an extraction circuit and from an optical communication link, received signals that may include first polarized data, second polarized data, a first polarized pilot component, and a second polarized pilot component; extracting, by the extraction circuit, the first and second polarized pilot components, the first polarized data and the second polarized data; wherein the first and second polarized pilot components belong to a pilot signal that has a pilot frequency that is within a frequency gap formed in a data spectrum that may include frequencies of the first and second polarized data; wherein the first polarized data and the first polarized pilot components are polarized by a first polarization and wherein the second polarized data and the second polarized pilot components are polarized by a second polarization that differs from the first polarization; coherently summing, by a pilot generator, the first and second polarized pilot components and generating first and second reconstructed pilot signals of substantially a same power; receiving, by a first coherent detector, at least a first portion of the first reconstructed pilot signal and the first polarized data; outputting, by the first coherent detector and in response to the at least first portion of the first reconstructed pilot signal and the first polarized data, at least one first data stream; receiving, by a second coherent detector, at least a first portion of the second reconstructed pilot signal and the second polarized data; outputting, by the second coherent detector and in response to the at least first portion of the second reconstructed pilot signal and the second polarized data, at least one second data stream.

The method may include generating an output signal of the transmitter in response to four data streams and second portions of the first and second reconstructed pilot signals.

The optical receiver may not include a local oscillator.

The optical receiver may not include a laser.

The pilot generator may include a controller that may be configured to detect a difference between powers of the first and second reconstructed pilot signals and to send a feedback signal that reduces the difference.

The pilot generator may include a pair of phase modulators followed by a coupler; wherein the feedback signal may be configured to change a phase shift between the pair of phase modulators in response to the difference between powers of the first and second reconstructed pilot signals.

The pilot generator may be a partial Mach Zehnder Modulator that may include a pair of phase modulators followed by a coupler.

The pair of phase modulators may be configured to operate in a push pull mode.

The extraction circuit may include a polarized de-multiplexer followed by a first filter bank and a second filter bank; wherein the first filter of the first filter bank may be configured to output the first polarized data and a second filter of the first bank filter may be configured to output the first polarized pilot component; and wherein the first filter of the second filter bank may be configured to output the second polarized data and a second filter of the second bank filter may be configured to output the second polarized pilot component.

The first and second data streams may be in phase and quadrature data streams.

The first and second polarizations may be orthogonal to each other.

For example X and Y polarizations.

The frequency gap may be positioned at a center of the data spectrum.

The first and second coherent detectors may be homodyne receiver detectors.

The first and second coherent detectors may be heterodyne receiver detectors.

BRIEF DESCRIPTION OF THE FIGURES

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

DETAILED DESCRIPTION OF THE DRAWINGS

Figure 1:
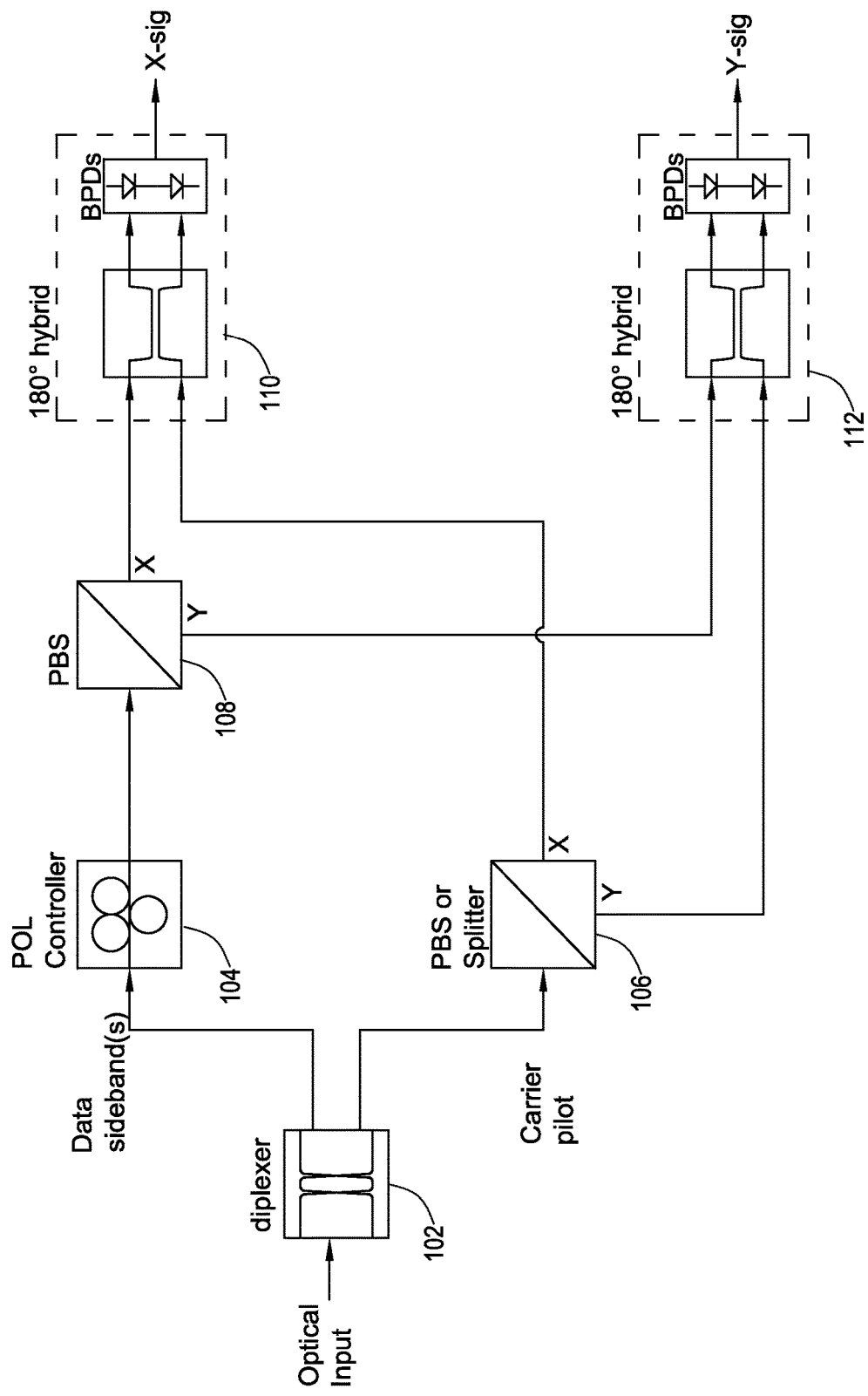
FIG. 1 illustrates a prior art receiver.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a system capable of executing the method.

Any reference in the specification to a system should be applied mutatis mutandis to a method that may be executed by the system.

There is provided a new SC POL-MUX novel optical transmission scheme which approaches the spectral efficiency of conventional coherent optical detection, while utilizing low electrical bandwidth and outperforming prior-art SC schemes in sensitivity (i.e., the proposed scheme requires less optical transmission power and/or attains longer reach).

Prior to introducing our novel SC Rx structure in the next section, let us briefly review the electro-optic back-end structure of a conventional COH Tx, as our SC Rx may work in conjunction with such conventional COH Tx structure, just injecting a different transmitted complex envelope signal.

A dual polarization coherent Tx, as conventionally used in coherent dual-polarization optical communication, is described in E. Ip and J. M. Kahn, "Fiber Impairment Compensation Using Coherent Detection and Digital Signal Processing," J. Light. Technol., vol. 28, no. 4, pp. 502-519, Feb. 2010. Such Tx independently modulates the two quadrature components (IQ) of each of the two orthogonal polarization components (XY) of the complex envelope of the transmitted optical vector-field. Thus, the coherent Tx comprises four linear electro-optical amplitude modulators (each such modulator maps input voltage into optical field amplitude without introducing phaseshift (chirp)). The IX and QX modulators are combined with 90° phase-shift to generate the X component of the field. Likewise, the IY and QY modulators are combined with 90° phase-shift to generate the Y component of the field. The X and Y components are combined by a polarization combiner to form the total transmitted vector field optical signal launched into the fiber link. A figure is not provided as this is well-known for those versed in the art but the coherent building blocks of 180° and 90° optical hybrids will appear in subsequent figures.

Finally, let us review the structure of a SC Rx 100 disclosed in U.S. Pat. No. 6,859,568 as in the next section we explain how the current patent goes beyond that prior art. The SC Rx is depicted in FIG. 1. A 1×2 optical system provides a 1:2 optical filter bank (referred to here as diplexer optical filter 102), filtering out the pilot (carrier) and data (information-bearing sidebands), such that these two signals appear at two distinct output optical spatial ports. The pilot output port is followed by a polarization beam splitter (PBS) 106.

The data (sidebands) output port of the diplexer is also split into two signal components, either by means of a POL-independent splitter, or preferably by means of a PBS 108. FIG. 1 also shows a polarization controller 104 between diplexer optical filter 102 and PBS 108. The X-POL output port of the pilot-splitting PBS and the X-POL output port of the data-splitter are routed to an optical combiner or in the preferred embodiment to an 180° optical hybrid 110 (consisting of a 2×2 directional coupler, the two outputs of which feed a balanced photo-diode pair, as conventionally used in coherent detection). Likewise, the Y-POL output port of the pilot-splitting PBS and the Y-POL output port of the data-splitter are routed to an optical combiner or in the preferred embodiment (shown in the figure) to an 180° optical hybrid 112. The electrical photo-current difference signals of each of the two 180° optical hybrids provide heterodyne demodulated electrical signals, which may be further processed in the electrical domain to extract the modulated information.

According to U.S. Pat. No. 6,859,568 a polarization controller (PC) is optionally inserted in between the pilot output of the diplexer optical filter. Our analysis indicates that under all practical fiber transmission conditions, assuming that the state-of-POL varies in time (varying fiber birefringence) and possibly over frequency (PMD), then the insertion of a POL-controller ahead of the pilot PBS is absolutely essential—the system would not function correctly without it, due to the so-called pilot POL-fading problem outlined above (and also described in A. Agmon, M. Nazarathy, D. M. Marom, A. Tolmachev, R. Killey, P. Bayvel, L. Meder, M. Hübner, W. Meredith, G. Vickers, P. C. Schindler, R. Schmogrow, D. Hillerkuss, W. Freude, C. Koos, and J. Leuthold, "OFDM/WDM PON With Laserless, Colorless 1 Gb/s ONUs Based on Si-PIC and Slow IC," IEEE J. Opt. Commun. Netw., vol. 6, no. 3, pp. 225-237, 2014 and M. Nazarathy and A. Agmon, "Doubling direct-detection data rate by polarization multiplexing of 16-QAM without active polarization control," Opt. Express, vol. 21, no. 26, pp. 31998-32012, 2013) as the pilot POL component along one of the two orthogonal POL axes of the PBS, may randomly fade out—once a pilot POL component diminishes or vanishes, the coherent mixing in the corresponding optical coupler or 180 hybrid is impaired or totally lost, and this may happen intermittently due to environmental variations of the state of POL of the received pilot, as extracted by the diplexer filter. In light of this analysis, we shall assume that the cascade of PC and PBS is placed on the pilot output port of the diplexer filter, as shown in FIG. 1, in order to generate two orthogonal pilot POL components of nearly equal magnitude.

Now, in terms of practical implementation, it turns out that a PC is quite a complex and expensive device (e.g., B. Koch, R. Noé, S. Member, V. Mirvoda, and D. Sandel, "Temperature-Insensitive and Two-Sided Endless Polarization Control," Photonics Technol. Lett., vol. 24, no. 22, pp. 2077-2079, 201 and R. G. Rabus, Integrated Ring Resonators. Springer, 2007). It would be desirable that the PC element disclosed in U.S. Pat. No. 6,859,568 (which we submit is not optional but is essential for the correct functioning of the architecture of U.S. Pat. No. 6,859,568) be replaced by a simpler sub-system, performing an equivalent or related function, such that two equi-power quasi-CW optical signals are generated, to be used as LOs for coherent detection of two orthogonal POL data components. A second problem is that it may be difficult to realize the optical diplexer filter in a POL-independent fashion as required in U.S. Pat. No. 6,859,568 and depicted in FIG. 1, fed by both orthogonal POL components. However, optical filters, such as diplexers may be realized for a particular state-of-POL by means of photonic integrated circuits (PIC) (E-field propagating in the PIC must be parallel to the PIC planar surface, i.e. linearly polarized in the PIC plane). Thus, an alternative SC Rx architecture is required, enabling PIC realizations and eliminating the restrictive requirement for a POL-independent diplexer required in U.S. Pat. No. 6,859,568 and also replacing the PC of U.S. Pat. No. 6,859,568 by a much simpler sub-system also realizable in PIC form. A novel SC Rx system satisfying the requirements just outlined is disclosed next, according to the teachings of the current invention.

POL-MUX HOM or HET SC Receiver with POL-Insensitive Remote Pilot Extraction

Prior to describing our novel SC POL-MUX Rx, let us briefly present the associated optical transmitter (Tx).

Base-Band Gapped Transmitter

The SC POL-MUX Rx introduced below operates in conjunction with a conventional coherent Tx, as reviewed at the end of the last section; it is just that the transmitted spectrum is modified by inserting a spectral gap in the interior of the transmitted data spectrum signal and positioning a pilot tone (P), essentially a discrete spectral line, within the spectral gap.

Our Tx differs then from a conventional one just in its preparation of the transmitted spectrum, which differs from the one of the conventional coherent (COH) HOM link just by having a spectral gap (denoted 208 in FIG. 2) in the interior (typically in the middle) of the data spectrum, with an optical pilot (P) 206 being inserted within the gap. This may be accomplished optically or electrically in the analog or digital domains. The net result is that there are two data sidebands, the upper one (204) and lower one (202), offset from the pilot by the two halves of the spectral gap.

The inserted optical pilot will be shown to be extracted by the corresponding SC Rx; the extracted optical tone is used as optical LO for coherent detection of the received optical field. This disclosure assumes such spectrum was transmitted and teaches how to robustly perform at the receiver side the pilot (remote local oscillators) extraction, while overcoming the effect of pilot polarization fading, combining the energy from the two received pilot polarization components most effectively to generate a pair of LOs for X and Y coherent detection in a pair of 90° hybrids.

Self-Coherent Polarization-Multiplexed Homodyne Coherent Receiver

Figure 3:
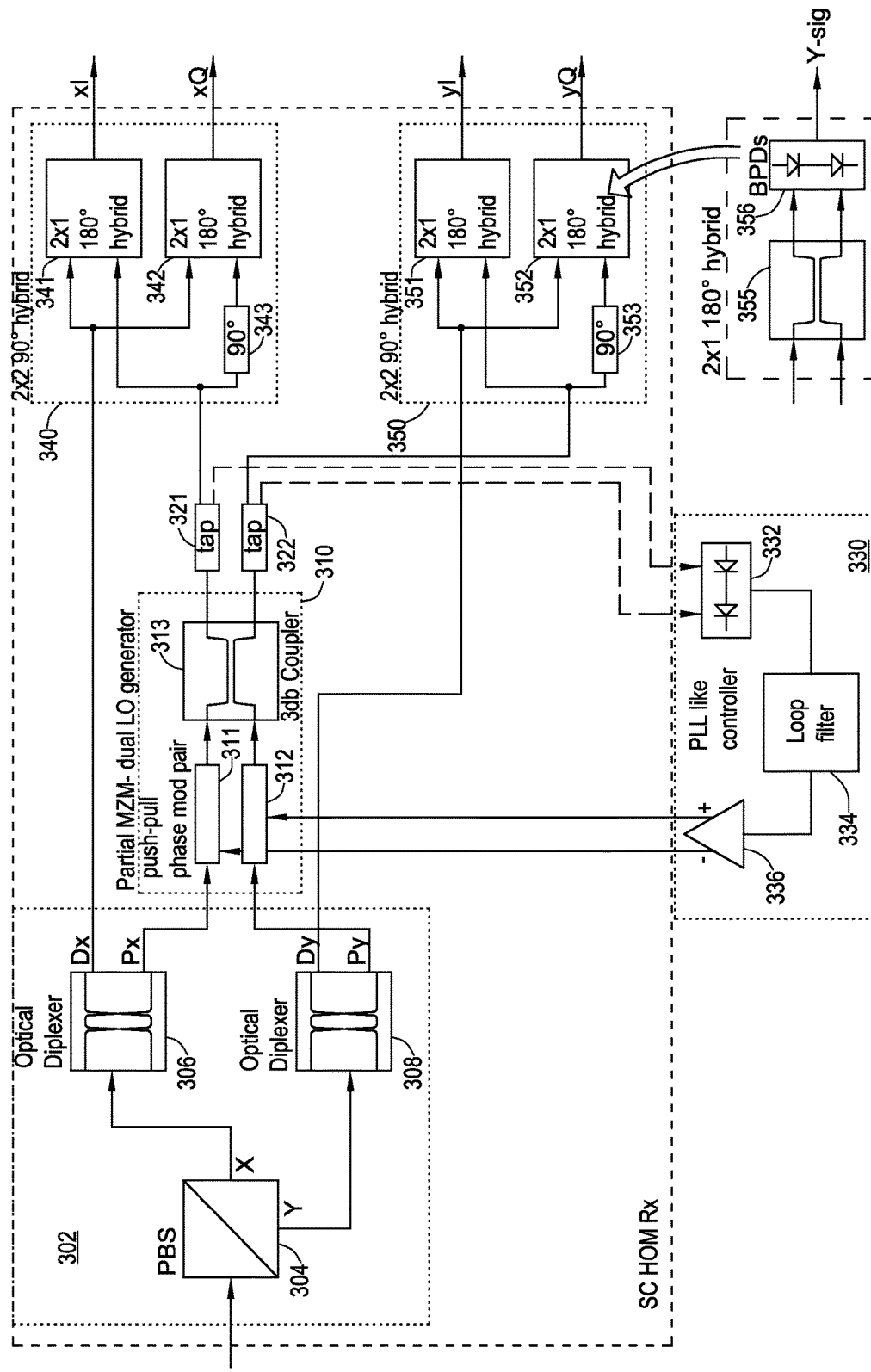
FIG. 3 illustrates a self-coherent homodyne receiver according to an embodiment of the invention.

FIG. 3 illustrates an optical receiver 300 according to an embodiment of the invention. The optical receiver of FIG. 3 is a homodyne optical receiver and may be referred to a SC POL-MUX HOM Rx.

Scrutiny of the self-coherent optical detection paradigm indicates that it is seemingly not amenable to homodyne (HOM) optical detection. In COH HOM detection, for each of the two POL components, two versions of the LO optical signal must be generated in quadrature (at 90° phase difference) and the split incoming signal POL component must be separately mixed with these two LOs in order to down-convert the I and Q components of the light to electrical signals.

To enable HOM-like detection in the context of self-coherent detection, it is essential to optically extract (optically filter out) the remotely sent and received pilot at the receiver for each POL component separately and also optically extract the received data signal and then feed data and the pilot to a conventional 90° optical hybrid to demodulate the data by means of the pilot.

The obstacle to making this strategy work is the pilot polarization fading effect described in the introduction. As the state-of-POL of the received signal randomly rotates, either the X-POL or Y-POL pilot component may fade out. This is in contrast with conventional COH detection, wherein the X and Y components of the pilot are readily made equal in power, simply by orienting the LO laser at 45° and resolving it onto two orthogonal polarizations, in effect yielding two equal nearly CW optical signals, to be used as LOs.

Given the considerations above, we may pose the following question. Suppose we extracted two orthogonal pilot POL components with random amplitudes and phases (but with the sum of squared of amplitudes of the two POL components being approximately constant). Can one then devise an optical processor capable of acting on these two orthogonal components and generating a pair of nearly equal power (quasi-CW) optical signals, to be respectively used as LO feed for the two 90° hybrids associated with the X and Y POL paths? This disclosure presents an efficient solution to this question, introducing a key optical sub-system within optical front-end of a SC Rx as described next.

The proposed SC optical Rx overcomes the pilot POL fading impairment, by spectrally filtering out the two POL components of the remote pilot (spectrally separating them out of the data) and coherently combining the two extracted pilot POL components to form two (substantially) equi-power LO signals (reconstructed pilot signals) which may be used for conventional coherent detection of the two data POL components, to be respectively used for coherent demodulation of the X and Y polarization components (just as practiced in a conventional coherent Rx). The term substantially means up to a predefined fraction (for example a difference of up to 5, 10, 15, 20, 25, 30, 35% of the power of one of the LO signals).

In detail, the structure of the SC Rx opto-electronic front-end is described in FIG. 3. The incoming optical signal is first separated into two orthogonal POLs components by means of a POL-splitter such as PBS 304. The X-POL and Y-POL are respectively directed to a pair of optical Tunable Diplexer Filters (TDF) 306 and 308. PBS 302 and TDFs 304 and 306 form an extraction circuit.

Figure 4:
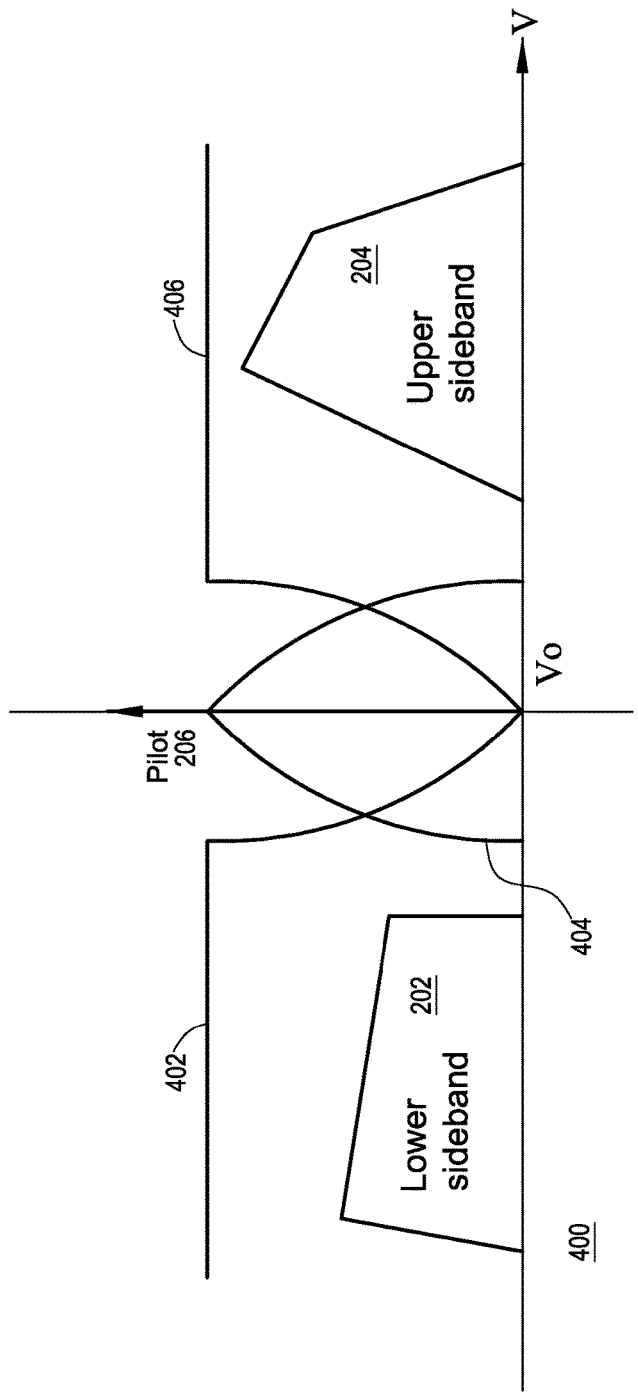
FIG. 4 illustrates the spectral response of various filters of filter banks and a spectrum of the received signal of FIG. 2, according to an embodiment of the invention.

Each optical TDF module amounts to an optical 1:2 analysis filter-bank, subjecting the input optical field to complementary low-pass filtering (LPF) and high-pass filtering (HPF) operations, with the two LPF and HPF transfer functions approximately summing to a constant, as depicted in FIG. 4—lower sideband 202 passes through the HPF (spectrum 402) of TDF 306, upper sideband 204 passes through the HPF (spectrum 406) of TDF 308, and the pilot passes through the LPFs (spectrum 404) of TDFs 306 and 308. Lower sideband 202 is also referred to as first polarized data. Upper sideband 204 is also referred to as second polarized data. First and second polarized components of pilot 306 pass through the LPFs of TDFs 306 and 308 respectively.

Figure 5:
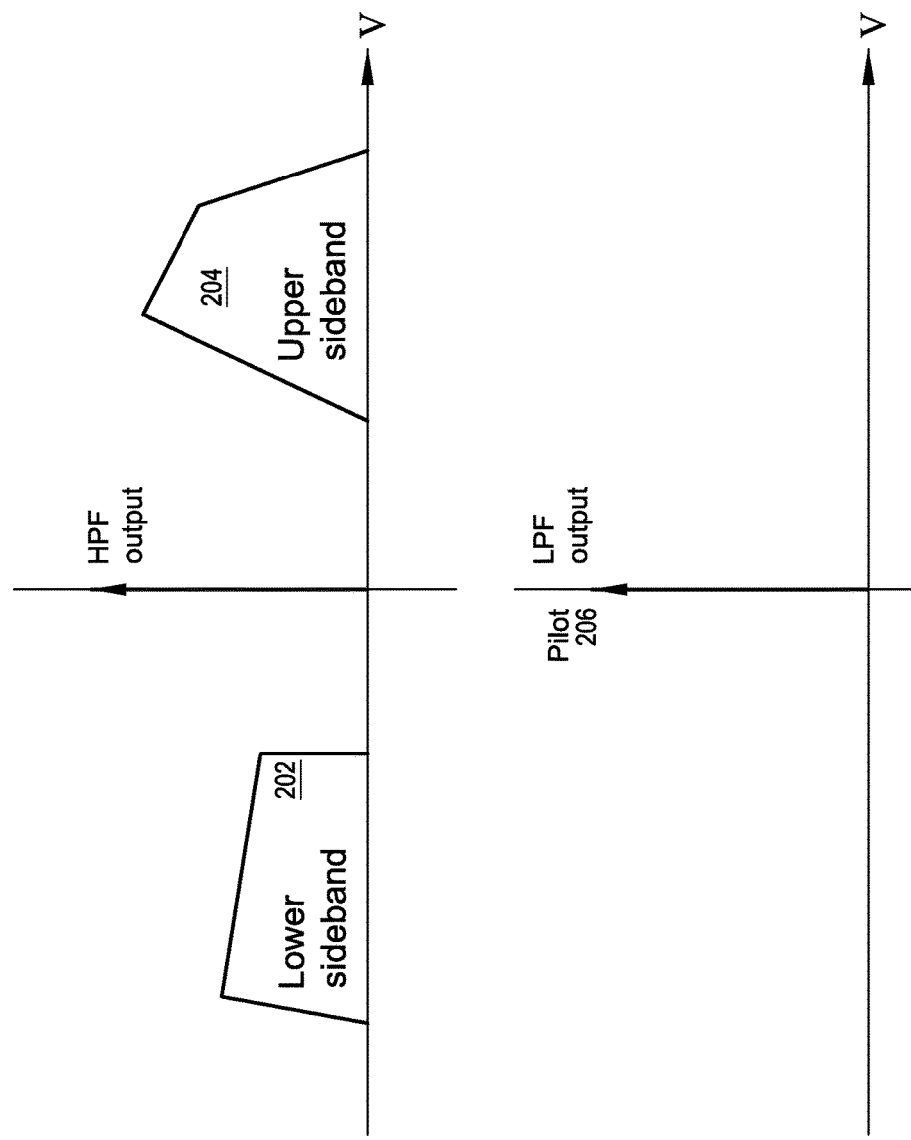
FIG. 5 illustrates the spectrum at the outputs of various filters of filter banks according to an embodiment of the invention.

The peak of the LPF coincides with the dip of the HPF at an optical frequency $v_0$ (or set of optical frequencies) which is tunable, ideally brought to equal that of the optical pilot, $v_0 = v_p$ e.g. by modifying the optical filter dimensions or optical path lengths (applying controlled phase shifts). FIG. 5 shows the spectra at the outputs of the LPF and the HPF ports. The LPF output port spectrum ideally just comprises the pilot 206, whereas the HLP output port ideally just comprises the data 204 and 206.

In practice some leakage of a residual data component may accompany the pilot and some leakage of a residual pilot component may accompany the signal.

There may be multiple realizations of the TDF module. E.g., a Bragg grating filter may be used along with a circulator to extract the backward propagating wave. Alternatively, a Fabri-Perot filter may be used in transmission and reflection modes. In both of these examples, the pilot extraction LPF is the forward propagating wave, whereas the complementary data sidebands extraction HPF is collected as the reflected backward wave.

One realization is by means of integrated-photonic microring resonant structures, e.g. the so-called Coupled-Resonator Optical Waveguides (CROW) as disclosed in D. G. Rabus, Integrated Ring Resonators. Springer, 2007, which consists of two or more micro-rings which are in near contact such that they are optically coupled, and are also optically coupled to an input and an output waveguide. An alternative microrings based realization uses multiple (two or more) single microring add-drop filters in tandem. The product of multiple optical transfer functions is sharper (i.e., it exhibits faster rolloff) than the individual transfer functions. Such microring based structures may display very sharp resonances, as suitable for our application. It is also possible to use other configurations of coupling between waveguides and microrings. Our preferred embodiment is the cascade of two or more single microrings (each coupled to a waveguide).

Referring back to FIG. 3, in each POL path (X or Y), the corresponding optical TDF serves to separate out the respective POL component (X or Y) of the optical pilot placed in the spectral gap situated at the center of the transmitted spectrum, as shown in FIGS. 4,5.

At the TDF complementary port (the notch HPF path output), there appears the transmitted data signal POL component, with the pilot suppressed. Ideally, then we would like the LPF extracting the pilot to have unity transfer function at its peak point and have the filter peak tuned to the spectral location whereat the pilot is situated and also have the filter stop-band be as depressed as possible. It is not essential to have a flat passband as just the pilot spectral line must be extracted, thus the spectral shape of the filter in its transition region does not matter—it is just desirable to have the transition region start at the innermost points of the data spectrum and to have the transfer function in the transition region as low as possible, such that the data spectrum not leak through along with the extracted pilot. Conversely the data-extracting HPF (notch filter) should have its notch as low as possible while the high-pass pass-band start outward at the two inner-most points of the data spectrum.

Denoting data-signal by D and pilot by P then the two received polarization components are $P_X + D_X$ and $P_Y + D_Y$, thus we have the respective $P_X, D_X$ optical signals at the two outputs of the X-TDF, whereas at the two outputs of the Y-TDF we have the respective $P_Y, D_Y$ optical signals. Assume for definiteness that the Tx launched its pilot linearly polarized at some angle relatively to the axes of the Rx polarization combiner, then due to the fiber propagation the received state of polarization changes, relative to the transmitted one, such that the two received pilot polarization components, as extracted at the X-TDF and Y-TDF LPF ports are most generally expressed as $$P_X = p_o \cos \theta_p e^{j\phi_p}, \quad P_Y = p_o \sin \theta_p e^{-j\phi_p} \qquad (1)$$

The relative amplitudes and phases of these two pilot POL components correspond to the random state-of-polarization (SOP) evolution between the Tx and Rx, as characterized by means of a pair of angular parameters, $\theta_p, \phi_p$ ($\theta_p$ determines the relative powers between the two received POL components, whereas $2\phi_p$ is the relative phase shift between the two received orthogonal POL components).

A point to be noted is that the two signals $P_X, P_Y$ and likewise the two signals $D_X, D_Y$ should all be polarization rotated into a common POL state, in order to enable the subsequent optical processing by superposing optical signals. This POL alignment condition is readily obtained by applying certain 90° POL rotations if necessary (this rotation may naturally occur in the POL-splitter in certain integrated photonic embodiments; in integrated photonics, a particular POL direction, typically parallel to the optical substrate, is supported for propagation within the photonic integrated circuit (PIC)). It follows that one or both of the POL components must be rotated to this common POL state, which may be henceforth characterized by complex scalars, representing the phasors (complex envelopes) of the optical field oscillations.

Returning to FIG. 3, the two extracted pilot POL components—first and second polarized components $P_X, P_Y$ (re-aligned to a common polarization direction) are coherently combined in quadrature (with 90° relative phase shift), by means of a pilot generator such as a module consisting of a pair of phase modulators 311 and 312 (or just one phase modulator and one unmodulated optical waveguide) followed by a 3 dB dual-input dual-output optical two-port referred to as 3 dB coupler 313 (alternatively realized for example as a directional coupler, a MultiMode Interference (MMI) structure or discrete-optical beam-splitter). The structure of the two phase modulators feeding the two input ports of the 3 dB coupler is referred to as "partial Mach Zehnder Modulator" (P-MZM) 210, as it may be obtained from a full dual output MZM by removing the input coupler or splitting but retaining the output coupler.

It is also possible to use a one-sided configuration consisting of a single phase modulator on one of the input ports of the 3-dB coupler with an unmodulated waveguide feeding other input port of the coupler, but this structure is less efficient than the two-sided structure comprising two phase modulators.

The objective of the one or two phase-modulators 311 and 312 is to induce a tunable relative phase change of at least up to $\pm \pi/2$ between the two optical signals $P_X, P_Y$. When two phase modulators are used, they are operated in push-pull mode, with bipolar opposite sign voltages applied to the two phase shifters to generate opposite sign phase changes, maximizing the phase difference between the two arms for given peak voltage. The function of the phase-modulators(s) stage is to make one path either advance or delay its phase relative to the other path in a certain amount, as specified below.

In terms of implementation of the phase-shifter(s) any suitable opto-electronic technology may be used, e.g. integrated photonic electro-optic modulators in Si, InP or LiNbO3, thermo-optic phase shifters (though it is hard to achieve large phase shifts thermo-optically). Significantly, the modulation bandwidth of the phase modulators must be sufficiently large to track the SOP changes of the two extracted pilot POL components $P_X, P_Y$, as manifested in the rate of variation of the relative angle $2\phi_p$ between the two POL components.

Practically, providing a modulation bandwidth of the order of 1 MHz should suffice for the phase modulator (or modulators) embedded in the SC receiver. Since the ~1 MHz modulation bandwidth is quite low relative to the bandwidth of the optical signals (which may be multiple GHz or tens of GHz) the electrodes applied to the optical waveguides of the phase modulator(s) may be of the lumped type, relaxing the electro-optic design and also enabling to meander the optical waveguide such as to reduce the length dimension of the overall photonic circuit.

The mathematical analysis to follow indicates that upon inducing a relative induced phase-shift no less than $\pm\pi/2$ to the two optical signals $P_X, P_Y$, then it is always possible (by applying a suitable relative phase shifts between the two paths) to bring the two optical powers at the two outputs of the 3 dB coupler to be equal (fixed in power, for a given total optical power received at the Rx input), no matter what the relative amplitudes of the two components $P_X, P_Y$ are and no matter what their relative phase is.

Let us denote the two outputs of the combiner as $L_X, L_Y$, then we practically should nearly have $|L_X| \cong |L_Y|$.

To achieve equality of the two 3 dB coupler output powers, the two coupler outputs are optically tapped (taps 321 and 322) by equal amounts and the two tap ports are fed into a balanced photo-diode (PD) pair 332, as shown, such as the difference of the two PD currents is generated. When this difference is zero, the two 3 dB coupler outputs have equal power, whereas the sign of the photocurrents difference may be used as an error signal to modify the relative phase (using a loop filter 334 of controller 330 and amplifier or buffer 336 that sends the feedback signals to the one or more phase modulators 211 and 312) applied between the two phase modulators, closing the feedback loop until the two output powers become equal (zero error signal), at which point the two outputs represent two equal optical local oscillators, $L_X$ and $L_Y$ to be further injected into the LO port of pair of 90° optical hybrids 340 and 350 (as well-known in the art of coherent detection—see E. Ip and J. M. Kahn, "Fiber Impairment Compensation Using Coherent Detection and Digital Signal Processing," J. Light. Technol., vol. 28, no. 4, pp. 502-519, February 2010) for the X-POL and Y-POL, respectively, forming an IQ-XY optically coherent demodulator.

Beyond the initial acquisition process, the feedback control loop acts in a tracking mode, continually counteracting the random phase difference variations between the two received POL components. The net result is that a pair of nearly equal optical pilots are generated with relatively slow (sub MHz rate) fluctuations of their amplitudes and phases, which are inconsequential when these two pilots are fed to the transmitter as local oscillators in the IQ-XY optically coherent demodulator.

As these two LO signals have been brought to nearly equal powers, then it is apparent that this disclosed structure overcomes the POL-fading problem of SC detection. Thus, the proposed SC Rx operation is similar to that of a conventional HOM coherent Rx, wherein the LO is typically split into two equal orthogonal polarization components, feeding two separate dual input dual outputs 90° optical hybrids (349 and 350—each includes a pair of dual input signal output 180° hybrids and a ninety degree phase shifter —341, 342 and 343 as well as 351, 352 and 353) used to demodulate the two POL components of the received optical signal).

Each dual input signal output 180° hybrid may include a dual input single output 180° hybrid 352 that include a coupler 355 followed by a pair of photodiodes 356.

The suggested coherent receiver makes efficient use of the entire received light—by virtue of the usage of the dual 3 dB coupler collecting light to both photo-diodes of the balanced pair, thus no light is structurally wasted in the optical front-end (there is inevitably excess loss non-ideality of the optics, but there are no free combiner ports, as would have resulted in a more simplistic optical combiner embodiment where either a 2:1 optical combiner were used, or the light were maximized just on one port of a 2:2 optical combiner. Such alternative embodiments would necessarily be lossy and/or generate two unequal LO signals—in contrast our preferred combining scheme of FIG. 3 for the two pilot POL components $P_X, P_Y$ is optimal.

The mathematical model describing the linear mapping of the coherent combining module is derived below. The "partial MZM" is described by the 2×2 MIMO transformation:

$$\begin{bmatrix} L_X \\ L_Y \end{bmatrix} = \underbrace{\frac{1}{\sqrt{2}} \begin{bmatrix} 1 & j \\ j & 1 \end{bmatrix}}_{\text{3 dB 2:2 coupler transfer matrix}} \underbrace{\begin{bmatrix} e^{-j\phi} & 0 \\ 0 & e^{j\phi} \end{bmatrix}}_{\text{phase-shifter(s) transfer matrix}} \begin{bmatrix} P_X \\ P_Y \end{bmatrix} = \frac{1}{\sqrt{2}} \begin{bmatrix} P_X e^{-j\phi} + jP_Y e^{j\phi} \\ jP_X e^{-j\phi} + P_Y e^{j\phi} \end{bmatrix} = \quad (2)$$

$$\frac{p_o}{\sqrt{2}} \begin{bmatrix} \cos\theta_p e^{j\phi_p} e^{-j\phi} + j\sin\theta_p e^{-j\phi_p} e^{j\phi} \\ j\cos\theta_p e^{j\phi_p} e^{-j\phi} + \sin\theta_p e^{-j\phi_p} e^{j\phi} \end{bmatrix} =$$

$$\frac{p_o}{\sqrt{2}} \begin{bmatrix} \cos\theta_p e^{j(\phi_p - \phi)} + j\sin\theta_p e^{-j(\phi_p - \phi)} \\ j\cos\theta_p e^{j(\phi_p - \phi)} + \sin\theta_p e^{-j(\phi_p - \phi)} \end{bmatrix}$$

where $\pm\phi$ are the two relative phases applied to the two phase-mods

Now, let $\Delta\phi \equiv \phi_p - \phi = 0$, which is attained by a feedback control loop as described below. Substituting the condition $\Delta\phi = \phi_p - \phi = 0$ into (2) yields:

$$\begin{bmatrix} L_X \\ L_Y \end{bmatrix} = \frac{p_o}{\sqrt{2}} \begin{bmatrix} \cos\theta_p e^{j(\phi_p - \phi)} + j\sin\theta_p e^{-j(\phi_p - \phi)} \\ j\cos\theta_p e^{j(\phi_p - \phi)} + \sin\theta_p e^{-j(\phi_p - \phi)} \end{bmatrix}_{\phi_p - \phi = 0} = \quad (3)$$

$$\frac{p_o}{\sqrt{2}} \begin{bmatrix} \cos\theta_p + j\sin\theta_p \\ j(\cos\theta_p - j\sin\theta_p) \end{bmatrix} = \frac{p_o}{\sqrt{2}} \begin{bmatrix} e^{j\theta_p} \\ je^{-j\theta_p} \end{bmatrix}$$

It is now apparent that $$|L_X| = |L_Y| = \frac{p_o}{\sqrt{2}},$$

i.e. the two resulting LOs emerging out of the coherent combining module become balanced in optical power (and have relative phase $2\theta_p - \pi/2$). Now, whenever $\Delta\phi \equiv \phi_p - \phi \neq 0$ the two output opt powers generally are:

$$\begin{bmatrix} |L_X|^2 \\ |L_Y|^2 \end{bmatrix} = \frac{p_o^2}{\sqrt{2}} \begin{bmatrix} |\cos\theta_p e^{j(\varphi_p-\phi)} + j\sin\theta_p e^{-j(\varphi_p-\phi)}|^2 \\ |j(\cos\theta_p e^{j(\varphi_p-\phi)} - j\sin\theta_p e^{-j(\varphi_p-\phi)})|^2 \end{bmatrix} = \quad (4)$$

$$\frac{p_o^2}{2} \begin{bmatrix} \cos^2\theta_p + \sin^2\theta_p + 2\text{Re}\{\cos\theta_p \sin\theta_p(-j)e^{j2(\varphi_p-\phi)}\} \\ \cos^2\theta_p + \sin^2\theta_p - 2\text{Re}\{\cos\theta_p \sin\theta_p(-j)e^{-j2(\varphi_p-\phi)}\} \end{bmatrix} =$$

$$\frac{p_o^2}{2} \begin{bmatrix} 1 + 2\text{Im}\{\cos\theta_p \sin\theta_p e^{j2(\varphi_p-\phi)}\} \\ 1 - 2\text{Im}\{\cos\theta_p \sin\theta_p e^{j2(\varphi_p-\phi)}\} \end{bmatrix} = \frac{p_o^2}{2} \begin{bmatrix} 1 + \sin2\theta_p \sin2\Delta\varphi \\ 1 - \sin2\theta_p \sin2\Delta\varphi \end{bmatrix}$$

Thus, as long as $\Delta\phi \equiv \phi_p - \phi \neq 0$ the two resulting LO powers are unequal, and complementary, adding up to $p_o^2$. For fixed polarization state (fixed parameters $\theta_p, \phi_p$) the difference of the two LO powers is given by:

$$\Delta P_L = |L_X|^2 - |L_Y|^2 = p_o^2 \sin 2\theta_p \sin 2\Delta\phi = p_o^2 \sin 2\theta_p \sin 2(\phi_p - \phi) \quad (5)$$

This optical powers difference signal is seen to vary sinusoidally in the induced phase difference $\Delta\phi \equiv \phi_p - \phi$. We may probe the two LO optical powers, e.g. by tapping off the same optical fraction of the two optical signals and photo-detecting the two tapped optical signals by means of two relatively narrowband optical receivers with bandwidth equal to that of the SOP variation in the fiber (e.g. of the order of 10 . . . 100 KHz). We then generate an electrical photocurrents difference signal proportional to the optical powers imbalance, $\Delta P_L$:

$$\Delta I = |I_X|^2 - |I_Y|^2 = \rho r_{tap} p_o^2 \sin 2\theta_p \sin 2\Delta\phi = \rho r_{tap} p_o^2 \sin 2\theta_p \sin 2(\phi_p - \phi) \quad (6)$$

where $\rho$, $r_{tap}$ are respectively the responsivity of the PD and the tapping optical power ratio. We introduce an electrical feedback control system acting on the photocurrents difference above to close the loop to the phase actuation difference, $\phi = (\pi/V_\pi)V$, of the phase-modulators(s) such that the control loop strives to null out the signal $\Delta I$. Notice that formally the output coincides with the output of a phase detector in a phase-locked-loop (PLL) system, thus the conventional PLL design techniques may be used (recalling that we operate here directly in the phase domain), e.g., placing an integrator and an optional loop filter in the loop. Other feedback control loop designs are possible, as conventionally taught. Notice that this loop operates at relatively low bandwidth (e.g. of the order of 10 . . . 100 KHz, sufficient to track the phase difference between the two polarization components as induced by the SOP fluctuations in the fiber link and in particular the bandwidth of the phase-shifter(s) need not be larger than that. E.g., if the phase-shifters are implemented by means of Si photonics then they represent a capacitive load of low admittance at the relatively low relevant frequencies, therefore the phase-shifter consumes negligible power and their design is relatively straightforward. As for the maximal amount of phase-shift necessary, as we need to null out $$\Delta P_L \propto \sin 2(\phi_p - \phi) = \sin 2\Delta\phi \quad (7)$$

by subtracting a control phase-shift $\phi$, as the nulls of sin $2\Delta\phi$ are spaced out by $\pi/2$ as a function of $\Delta\phi$, it suffices to apply a phase-shift $\phi$ satisfying $|\phi| \leq \pi/2$ in order to null out (7), irrespective of the value of $\phi_p$.

An alternative intuitive way to understand the properties of the novel pilots coherent combining system is by means of graphic construction describing the phasors additions in Eq. (2), which is equivalent to, $$\frac{\sqrt{2}}{p_o} L_X = \cos\theta_p e^{j\Delta\varphi} + j\sin\theta_p e^{-j\Delta\varphi} \quad (8)$$

$$-j\frac{\sqrt{2}}{p_o} L_Y = \cos\theta_p e^{j\Delta\varphi} - j\sin\theta_p e^{-j\Delta\varphi}$$

Where $\Delta\phi \equiv \phi_p - \phi$. Further multiplying both equations by $e^{-j\Delta\phi}$ yields $$\frac{\sqrt{2}}{p_o} e^{-j\Delta\varphi} L_X = \cos\theta_p + j\sin\theta_p e^{-j2\Delta\varphi} = \cos\theta_p + \sin\theta_p e^{j(\frac{\pi}{2}-2\Delta\varphi)} \equiv \Sigma \quad (9)$$

$$-j\frac{\sqrt{2}}{p_o} e^{-j\Delta\varphi} L_Y = \cos\theta_p - j\sin\theta_p e^{-j2\Delta\varphi} = \cos\theta_p - \sin\theta_p e^{j(\frac{\pi}{2}-2\Delta\varphi)} \equiv \Delta$$

Figure 6:
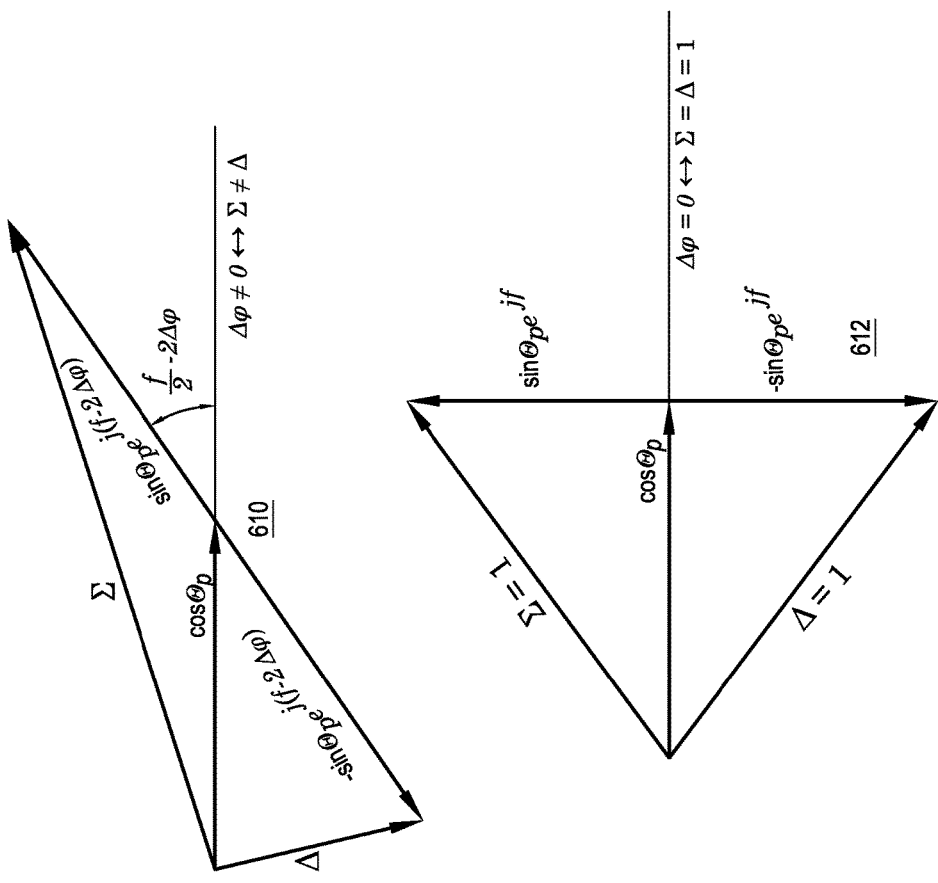
FIG. 6 is a graphical representation of the process of coherently combining first and second polarized components of the received pilot according to FIG. 3 according to an embodiment of the invention.

In FIG. 6 (graphs 610 and 612) we plot the addition and subtraction of the two phasors, $$\cos\theta_p, \sin\theta_p e^{j(\frac{\pi}{2}-2\Delta\varphi)},$$

corresponding to the last expressions in the two equations. The utility of working out this addition and subtraction stems from the fact that the two phasor lengths satisfy $$\left|\frac{\sqrt{2}}{p_o} e^{-j\Delta\varphi} L_X\right| = \frac{\sqrt{2}}{p_o}|L_X|, \left|-j\frac{\sqrt{2}}{p_o} e^{-j\Delta\varphi} L_Y\right| = \frac{\sqrt{2}}{p_o}|L_Y|,$$

thus working with the two phasors in the left-hand-sides of (9) amounts lengthwise to working with the lengths of the two original phasors $L_X L_Y$. Now, the phasors in (9) (sum and difference of the two phasors $$\cos\theta_p, \sin\theta_p e^{j(\frac{\pi}{2}-2\Delta\varphi)}$$

may be graphically obtained as the lengths of the resultants of the triangle rule addition of the two phasors $$\cos\theta_p, \pm\sin\theta_p e^{j(\frac{\pi}{2}-2\Delta\varphi)}$$

(i.e., the second phasor is 180° reflected). Upon adding and subtracting the two phasors $$\cos\theta_p, \sin\theta_p e^{j(\frac{\pi}{2}-2\Delta\varphi)}$$

the sum and difference resultants $\Sigma, \Delta$ have the same lengths as $$\frac{\sqrt{2}}{p_o}|L_X|, \frac{\sqrt{2}}{p_o}|L_Y|,$$

respectively.

It is graphically evident that whenever the relative angle of the two phasors differs from 90° (i.e., $\Delta\phi \neq 0$) the sum and difference of the two phasors $$\cos\theta_p, \sin\theta_p e^{j(\frac{\pi}{2}-2\Delta\varphi)}$$

attain unequal lengths. It is just for $\Delta\phi=0$ that the two phasors reduce to become perpendicular, as in this case they reduce to $$\cos\theta_p, \sin\theta_p e^{j\frac{\pi}{2}}.$$

Now, adding/subtracting two perpendicular phasors yields equal lengths respective resultants, since the horizontal axis becomes the axis of symmetry of an isosceles triangle with vertical basis. Pythagoras' theorem, the sum and difference phasors both have lengths $\sqrt{\cos^2\theta_p + \sin^2\theta_p} = 1$, i.e.

$$\frac{\sqrt{2}}{p_o}|L_X| = \frac{\sqrt{2}}{p_o}|L_Y| = 1 \text{ or } |L_X| = |L_Y| = \frac{p_o}{\sqrt{2}},$$

thus attaining, $\Delta\phi \equiv \phi_p - \phi$, i.e. having the applied modulation phase, $\phi$, track the polarization phase half-difference, $\phi_p$, yields two LO signals of equal moduli (and powers), though their phases differ (but phase differences of X and Y LO signals are irrelevant, as they get corrected in subsequent signal processing phases).

Notice that in the optical configuration of FIG. 3 the 90° angle is provided by the cross-over of the 3 dB coupler; the role of the two phase modulators, being modulated antipodally (one with advanced phase while the other with delayed phase) is to bring the two output phasors (at the output of each phase modulator) in phase prior to the provision of the 90° relative angle by the 3 dB coupler.

A simple graphical consideration indicates that there is no need to rotate the relative phase between the two phasors by more than ±90° in order to transform them to become orthogonal vectors in the complex plane. Thus, the push-pull phase modulator (partial Mach-Zehnder) should be designed to provide at least 180° phase change, i.e., a voltage difference of at least $V_\pi$ should be provided for ($\pm\frac{1}{2}V_\pi$).

The proposed SC Rx (FIG. 3) differs from that in (FIG. 1) both structurally and functionally, in the following respects:

(i) The SC Rx disclosed here may operate in either HOM COH detection or HET COH detection mode, whereas the system disclosed in U.S. Pat. No. 6,859,568 only operates in HET COH detection mode.

(ii) The order of the concatenation of the optical diplexer filter and the PBS splitter(s) is reversed here relative to that in FIG. 1, which has the two output ports of the optical diplexer being followed up by one or two PBS splitter(s). Here a single PBS splitter is inserted right at the optical input of the SC Rx, and its two X-POL and Y-POL ports are each fed in a diplexer filter. Thus our system comprises a pair of diplexer filters, each of which operates in a particular state-of-POL, e.g. TE field in plane of a PIC photonic circuit. In contrast the SC Rx [6] has a single diplexer filter preceding the two PBS modules.

(iii) The PC of FIG. 1, which is a fairly complex device, is eliminated, being replaced by a much simpler "partial MZM" providing the function of COH-POL-combiner-splitter. This simpler sub-system consists of a pair of slow (sub MHz) phase modulators feeding the two input ports of a 3 dB directional coupler, the two output ports of which are tapped out, with the taps feeding a balanced photo-diode pair, while the through ports of the two taps provide two equi-power LO signals to be used as LO feeds in two 180° optical hybrids for HET SC detection, or in a pair of 90° optical hybrids for HOM SC detection.

Equipping the SC POL-MUX HOM or HET Receiver with Bi-Directional Capability

If the SC Rx disclosed above were to be used in a bi-directional optical transmission system (over two separate fibers) then one could have a COH Tx and a SC Rx at each end such that the Tx at one end feeds the SC Rx at the other end. A laser source would be provided at each end to feed the corresponding COH Tx. However there may be situations wherein it is advantageous to provide a laser source just at one end, e.g. when the remote end must be low cost and the laser at the Tx end may be shared by frequency or wavelength division multiplexing among multiple data channels intended to multiple remote terminals.

The pair of equi-power pilots as generated in the SC Rx disclosed above may be used for POL-MUX transmission in the reverse direction on either the same fiber or over a different fiber, which may be useful for bidirectional transmission in the context of optical access networks or more generally short-reach communication applications. In an access network context (in particular for a passive-optical network (PON)), the reverse transmission sense would be referred to as upstream (US), whereas the original transmission sense would be referred to as downstream (DS). We shall borrow this terminology for any bi-directional link even when the setup is not that of an access network. Below we disclosed a novel reflective transceiver, applicable in particular to reflective optical access networks or more generally for bi-directional short reach optical communications ("reflective" means that the optical source for US transmission is effectively provided remotely, transmitted as a pilot tone in the DS direction, with the received DS light signal being re-directed to US transmission and or remodulated in the US direction).

In this proposed asymmetric bi-directional transceiver system, an optical source is located just at the transmitter originating the DS transmission. The DS Tx may coincide the one disclosed above for usage with the Rx of FIG. 3. The new bidirectional disclosed DS Rx in the remote terminal is laserless (does not contain an optical source for US transmission). The optical signal for US transmission is extracted from the pilot of the DS transmission.

Such asymmetric configuration (laser just at one side of the link, in the DS Tx_ may be convenient for point to multipoint access networks wherein the DS Rx must be simplified. Indeed, the removal of the laser in the DS Rx and the sharing of a stronger laser source placed in the DS Tx to serve multiple DS Rx-s reduces the complexity and cost of the remote DS terminals; The complete self-coherent remote transceiver with POL-insensitive remote pilot extraction, comprising both a DS Rx an US Tx is described in FIG. 7. The figure resembles that of FIG. 3, but is enhanced by the presence of an US Tx, which is fed by a fraction of the extracted DS pilot (the extraction of which follows the teachings of this invention).

Figure 7:
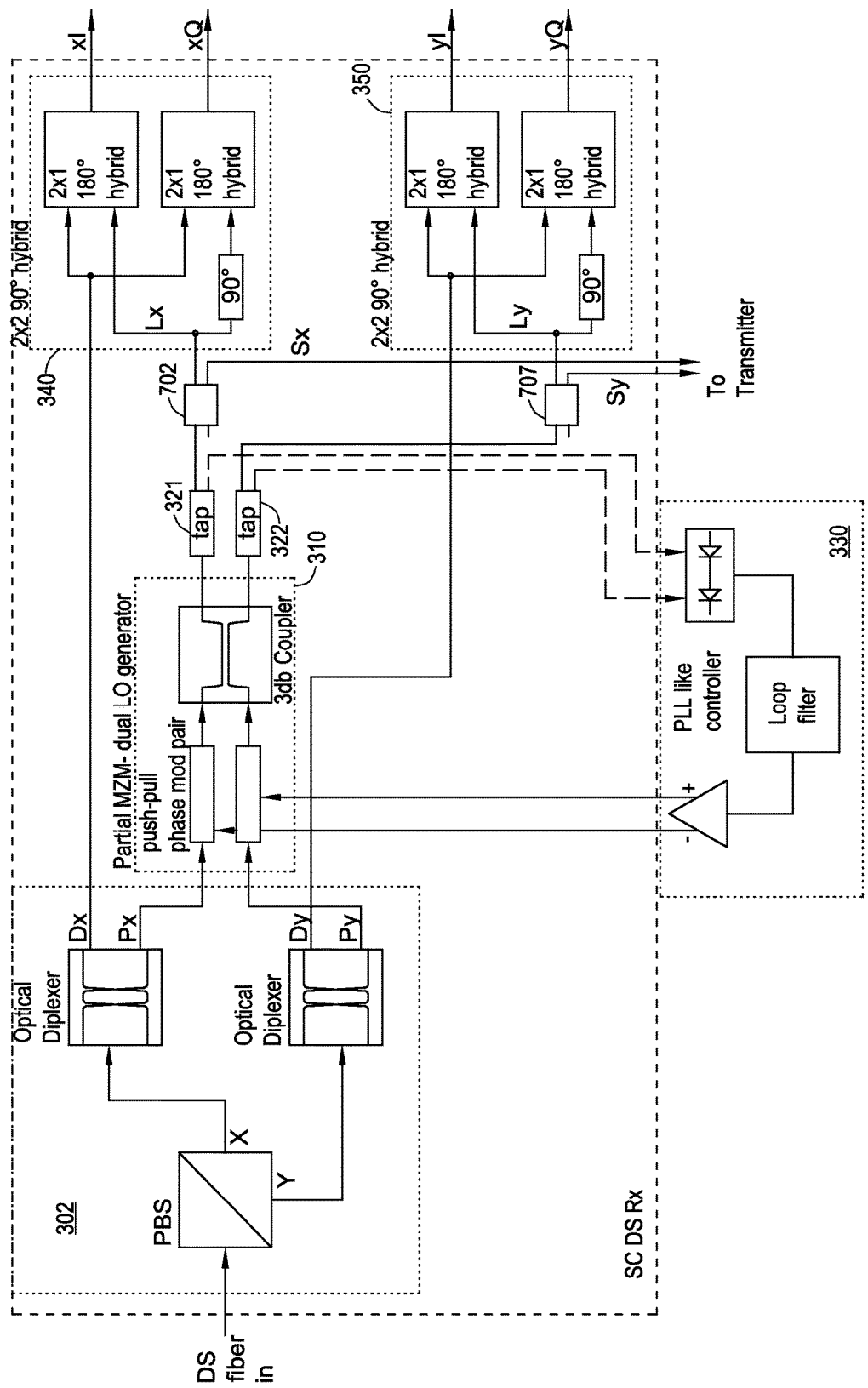
FIGS. 7 and 8 illustrate an optical transceiver arranged for remote laserless terminal for bi-directional transmission, according to an embodiment of the invention.
Figure 8:
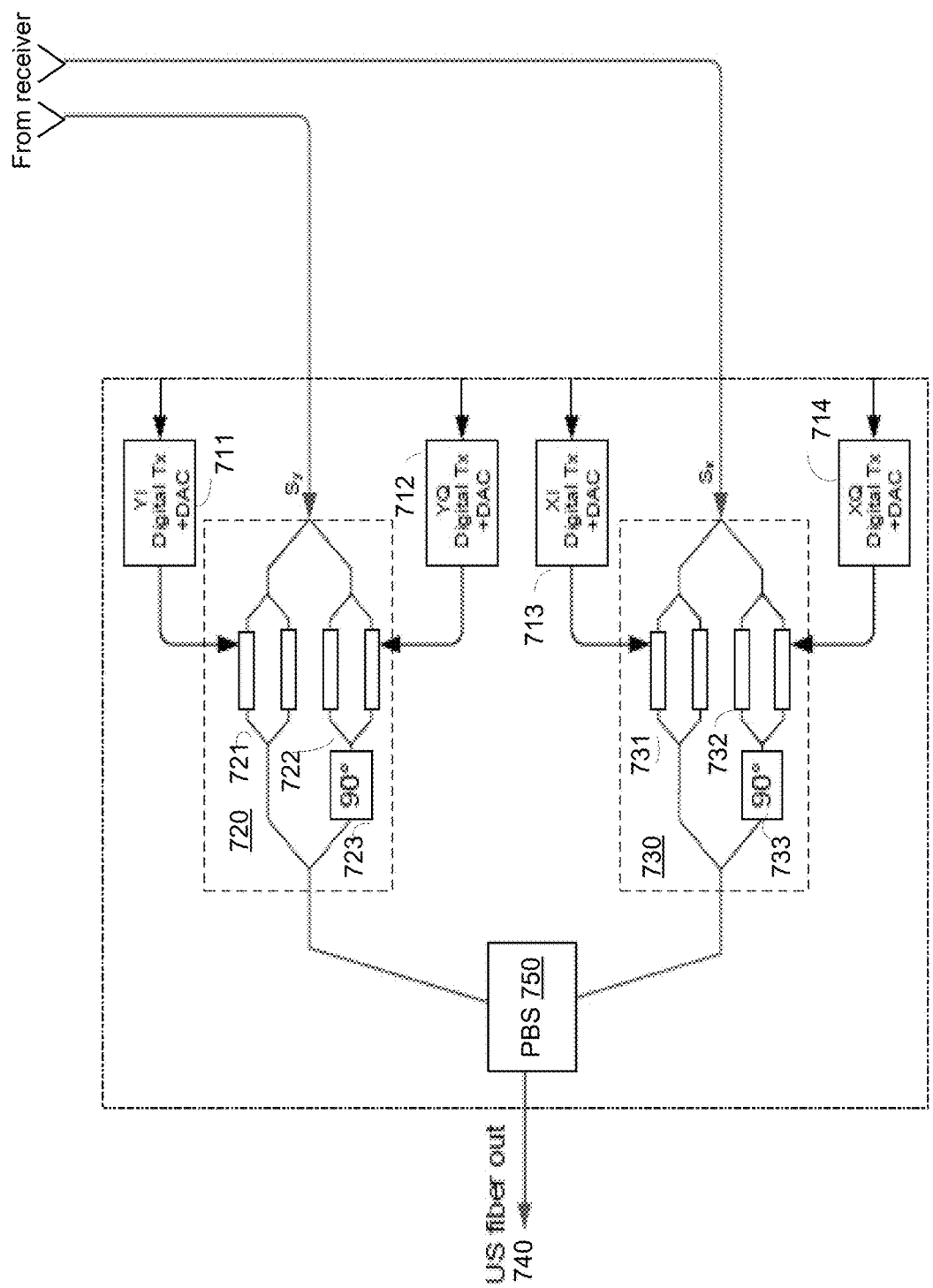

In FIGS. 7 and 8, an optical transceiver 700 is illustrated. The optical transceiver 700 is illustrated as including an optical receiver (FIG. 7) and an optical transmitter 720 (FIG. 8).

The optical receiver of FIG. 7 differs from the optical receiver of FIG. 3 by including two splitters 702 and 704 that send first portions of the first and second reconstructed pilot signals to the first and second dual-input dual output 90° hybrids 340 and 350 respectively and also send second portions of the first and second reconstructed pilot signals to the optical transmitter 720.

The second portions of the first and second reconstructed pilot signals Sx and Sy are used as local oscillator signals and the optical transmitter generates an output signal based on the second portions of the first and second reconstructed pilot signals and four data streams—illustrated by YI, YQ, XI and XQ digital transmitters and DACs 711, 712, 713 and 714 that perform signal conversion and modulation.

Sy and data streams YI (from YI digital transmitter and DAC 711) and YQ (from YQ digital transmitter and DAC 712) are fed to electro-optic IQ modulator for Y polarization 720.

Sy and data streams XI (from XI digital transmitter and DAC 713) and XQ (from XQ digital transmitter and DAC 714) are fed to electro-optic IQ modulator for X polarization 730.

The output signals from electro-optic IQ modulator for X polarization 730 and electro-optic IQ modulator for Y polarization 720 are fed to PBS 750 and the output of PBS 750 is fed (as an output signal of the transmitter) to upstream fiber 740.

Each one of electro-optic IQ modulator for Y polarization 720 and electro-optic IQ modulator for X polarization 730 may include two Mach-Zehnder modulators (721 and 722 as well as 731 and 732 respectively) for the I and Q arms respectively which are combined by a 90 degree (quarter wavelength) optical phase shift (723 and 722 respectively).

For the DS receiver we use an optical front-end system similar to the BBG-HOM Rx disclosed in FIG. 3, with the following modification: the two equi-power LOs, as extracted from the downstream (DS) transmission at the two ports of the 3 dB coupler terminating the partial MZM, are now each optically split two-way in some splitting ratio (which depends on the link budget conditions); one port of each splitter provides the X- and Y-LO signals for DS detection, as before, whereas the other port of each splitter provides an upstream source for a particular POL branch of the US Tx. Thus, the X (Y)-branch splitter generates the signals $L_X, S_X (L_Y, S_Y)$ and $L_X, L_Y$ are used to drive the two X- and Y0 90° hybrids for coherent-like detection in the DS Rx, whereas $S_X, S_Y$ are new optical signals used to feed the US Tx. Specifically these two derived nearly-CW signals feed the X- and Y-branches of a US Tx, similar to that used conventionally for coherent detection. Each of the X- and Y-branches comprise either electro-optic single quadrature modulator or a nested IQ modulator. Finally the two modulated optical signals are optically combined into a single output signal having both its quadratures modulated.

At the level of secondary detail, notice that one-to-one mapping between the four output ports of the two splitters on one hand and the two X- and Y-LOs and the two feeds into X- and Y-upstream optical modulators is arbitrary, but corresponding splitting ratios must be selected). Further notice that the cascade of each two-way tap and two-way splitter on each branch associated with a particular POL may be replaced by a three-way splitter with appropriate splitting ratio.

This proposed transceiver provides two key advantages relative to conventional remote transceivers of the reflective type: In the DS direction it enables POL-MUX i.e., a doubling of spectral efficiency. In the US direction, it also enables POL-MUX by mitigating the following problem which arises in remote terminals (e.g., optical network units (ONU) in PON access networks), wherein the DS pilot is resolved in two polarizations which are each redirected for US transmission. In such conventional self-coherent systems, the received DS pilot (which is to be re-directed for US transmission) may randomly fade on one of the two POL axes, precluding US re-modulations of independent data onto the two extracted POL components (as one or the other of the POL components may fade out). This indicates that the proposed method of POL-diverse remote pilot extraction enables dual polarization multiplexing (POL-MUX) in the US direction as well as in the DS direction. In contrast, M. Nazarathy and A. Agmon, "Doubling direct-detection data rate by polarization multiplexing of 16-QAM without active polarization control," Opt. Express, vol. 21, no. 26, pp. 31998-32012, 2013 illustrartes an HET Rx with POL-MUX by 3-way redundancy enabled DS POL-MUX but would not allow US POL-MUX. As the usage of POL-MUX in any direction (either US or DS) doubles the data-rate in that direction (hence the bi-directional system proposed here doubles spectral efficiency in both the US and DS direction.

We note that the system described in FIGS. 7 and 8 corresponds to having two separate fibers for the two DS and US communication directions. If it is desired to transmit over the same fiber bi-directionally, it is advantageous to provide means to frequency-shift the US modulated spectrum relative to the DS received spectrum; circumventing the US-DS spectral overlap is beneficial for mitigating the reflections—and Rayleigh-scattering induce cross-coupling between the US and DS propagation senses.

One method to induce spectral shifting is by inserting optical SSB modulators into the two arms labeled $S_x$, $S_y$. A second method is to insert electrical SSB modulators onto the electrical modulating analog signals feeding the two IQ modulators. Such SSB spectral offset technique has been detailed in U.S. patent application Ser. No. 13/805,344 and in Agmon, M. Nazarathy, D. M. Marom, A. Tolmachev, R. Killey, P. Bayvel, L. Meder, M. Hübner, W. Meredith, G. Vickers, P. C. Schindler, R. Schmogrow, D. Hillerkuss, W. Freude, C. Koos, and J. Leuthold, "OFDM/WDM PON With Laserless, Colorless 1 Gb/s ONUs Based on Si-PIC and Slow IC," IEEE J. Opt. Commun. Netw., vol. 6, no. 3, pp. 225-237, 2014. Those skilled in the art would be able to modify FIG. 7 to insert the one-sided spectral shifting capability, which would enable having a single fiber carry the bi-directional optical traffic with minimal crosstalk.

Self-Heterodyne Implementation

Figure 2:
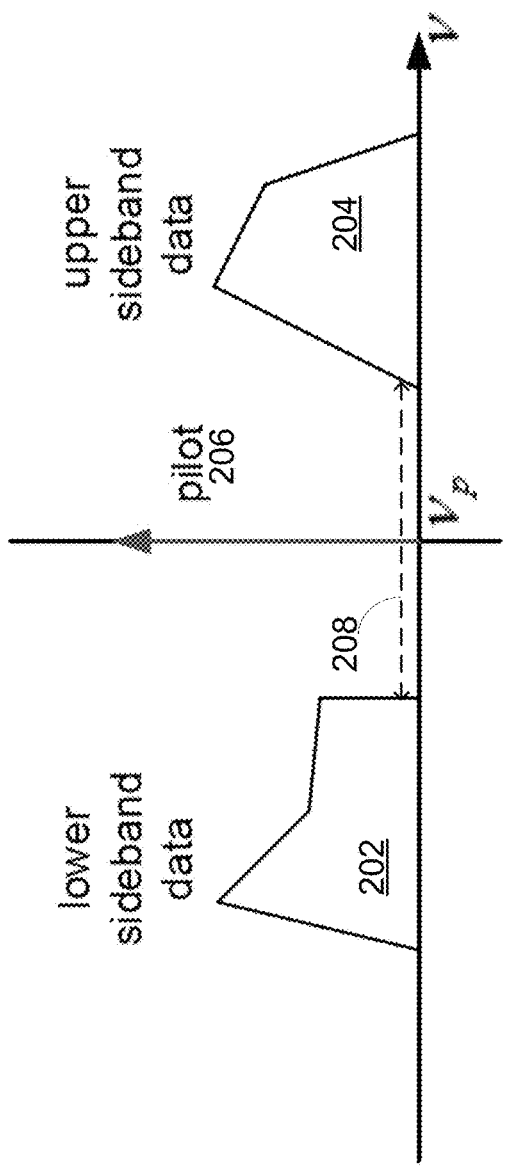
FIG. 2. Illustrates an optical spectrum according to an embodiment of the invention.

Heretofore we have described homodyne-like schemes wherein the spectrum of the data is two-sided around the pilot which acts as LO after extraction. We say "homodyne-like as there is a gap at baseband in the detected complex envelope, nevertheless the LO is in the middle of the spectrum. As a special case, since the upper and lower data sidebands in FIGS. 2,4,5 are arbitrary and independent, it is possible to null out one of the sidebands (either the upper or the lower one). This effectively converts the homodyne-like detection into heterodyne-like detection. In this case the transmitted spectrum consists of a pilot separated by some gap from one sideband either at higher or lower frequency.

In U.S. patent application Ser. No. 13/805,344 and in Agmon, M. Nazarathy, D. M. Marom, A. Tolmachev, R. Killey, P. Bayvel, L. Meder, M. Hübner, W. Meredith, G. Vickers, P. C. Schindler, R. Schmogrow, D. Hillerkuss, W. Freude, C. Koos, and J. Leuthold, "OFDM/WDM PON With Laserless, Colorless 1 Gb/s ONUs Based on Si-PIC and Slow IC," IEEE J. Opt. Commun. Netw., vol. 6, no. 3, pp. 225-237, 2014 we referred to a heterodyne-like self-coherent setup as self-heterodyne.

Figure 9:
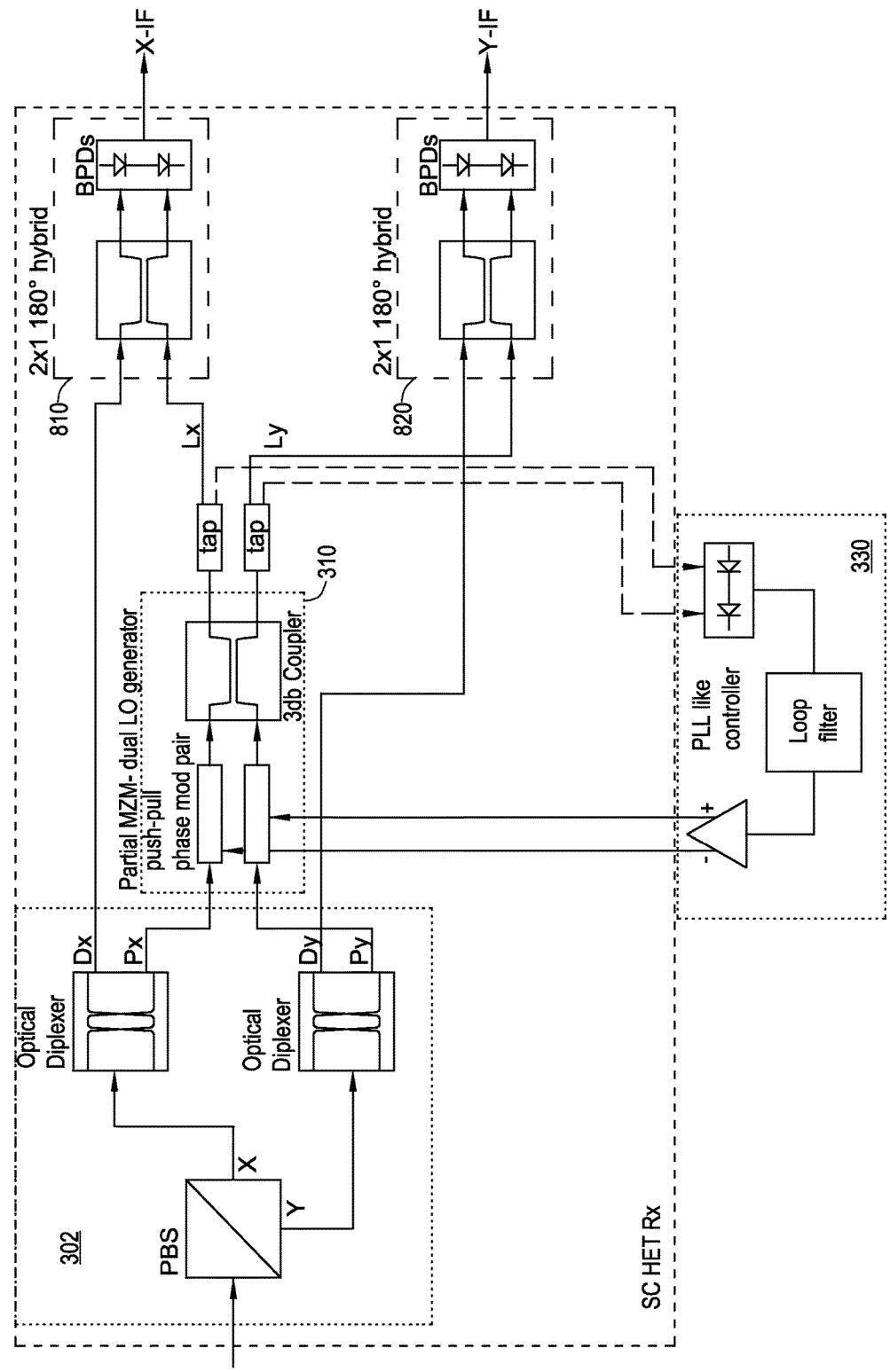
FIG. 9 illustrates a self-coherent heterodyne receiver according to an embodiment of the invention.

The embodiments of FIGS. 3 and 7-8 may be simplified to address the self-heterodyne case by replacing the 90° hybrids by 180° hybrids (since the full bandpass information is available in just one optical quadrature, which may be electrically demodulated with two electrical carriers 90° apart in phase in order to recover the two quadratures in the electrical analog or digital domain). Since each 90° hybrid internally contains two 90° hybrids, it follows that we may just remove one of the 180° hybrids in each of the X- and Y-branches, yielding the scheme of FIG. 9 for a self-heterodyne Rx. The coherent receiver 800 of FIG. 8 includes heterodyne detectors 810 and 820 (dual input single output 180° hybrids 810 and 820 instead of dual input dual output 180° hybrids 340 and 350).

A corresponding bi-directional self-heterodyne receiver may be drawn, similar to FIG. 7 but with 180° hybrids rather than 90° hybrids, but this figure is not shown as it is evident from the description of this sentence.

Figure 10:
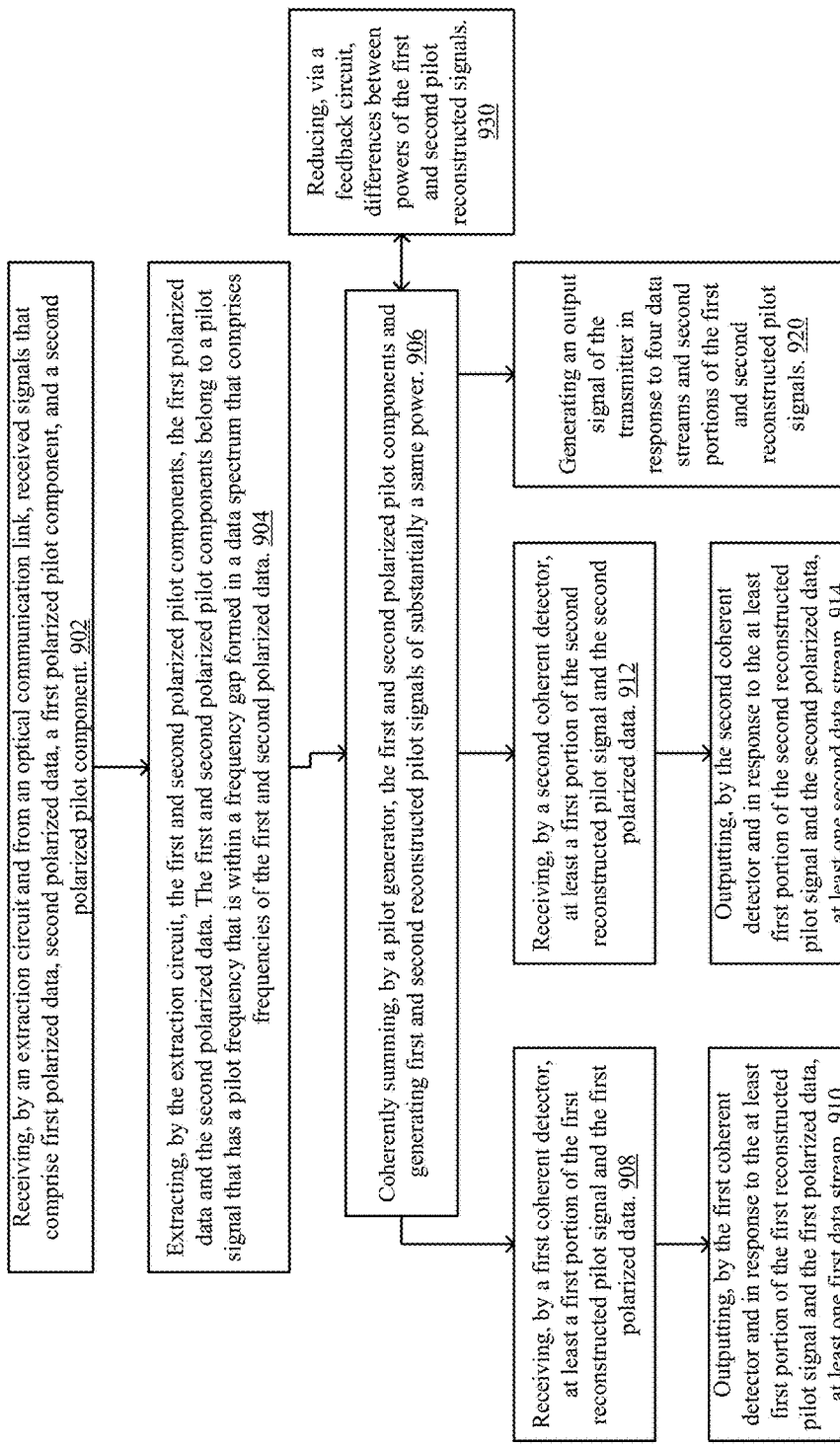
FIG. 10 illustrates a method according to an embodiment of the invention.

FIG. 10 illustrates method 900 according to an embodiment of the invention.

Method 900 may start by step 902 of receiving, by an extraction circuit and from an optical communication link, received signals that comprise first polarized data, second polarized data, a first polarized pilot component, and a second polarized pilot component.

Step 902 may be followed by step 904 of extracting, by the extraction circuit, the first and second polarized pilot components, the first polarized data and the second polarized data.

The first and second polarized pilot components belong to a pilot signal that has a pilot frequency that is within a frequency gap formed in a data spectrum that comprises frequencies of the first and second polarized data.

The first polarized data and the first polarized pilot components are polarized by a first polarization and wherein the second polarized data and the second polarized pilot components are polarized by a second polarization that differs from the first polarization.

Step 904 may be followed by step 906 of coherently summing, by a pilot generator, the first and second polarized pilot components and generating first and second reconstructed pilot signals of substantially a same power.

Step 906 may be followed by steps 908 and 912.

Step 908 may include receiving, by a first coherent detector, at least a first portion of the first reconstructed pilot signal and the first polarized data.

Step 908 may be followed by step 910 of outputting, by the first coherent detector and in response to the at least first portion of the first reconstructed pilot signal and the first polarized data, at least one first data stream.

Step 912 may include receiving, by a second coherent detector, at least a first portion of the second reconstructed pilot signal and the second polarized data.

Step 912 may be followed by step 914 of outputting, by the second coherent detector and in response to the at least first portion of the second reconstructed pilot signal and the second polarized data, at least one second data stream.

According to an embodiment of the invention method 900 may also include step 930 of reducing, via a feedback circuit, differences between powers of the first and second pilot reconstructed signals.

Method 900 may also include step 920 of generating an output signal of the transmitter in response to four data streams and second portions of the first and second reconstructed pilot signals. See, for example, the optical transceiver of FIG. 7.

In the foregoing specification, the invention has been described with reference to specific examples of embodiments of the invention. It will, however, be evident that various modifications and changes may be made therein without departing from the broader spirit and scope of the invention as set forth in the appended claims.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an."

The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

We claim:

1. An optical receiver that comprises an extraction circuit, a pilot generator, a first coherent detector and a second coherent detector;
   wherein the extraction circuit is configured to (a) receive, from an optical communication link, a received signal that comprise first polarized data, second polarized data, a first polarized pilot component, and a second polarized pilot component and (b) extract the first and second polarized pilot components, the first polarized data and the second polarized data;
   wherein the first and second polarized pilot components belong to a pilot signal that has a pilot frequency that is within a frequency gap formed in a data spectrum that comprises frequencies of the first and second polarized data;
   wherein the first polarized data and the first polarized pilot components are of a first polarization and wherein the second polarized data and the second polarized pilot components are of a second polarization that differs from the first polarization;
   wherein the pilot generator is configured to coherently sum the first and second polarized pilot components and to generate first and second reconstructed pilot signals of substantially a same power;
   wherein the first coherent detector is configured to receive the first reconstructed pilot signal and the first polarized data and to output at least one first data stream; and
   wherein the second coherent detector is configured to receive the second reconstructed pilot signal and the second polarized data and to output at least one second data stream.

2. The optical receiver according to claim 1 wherein the receiver does not include a local oscillator.

3. The optical receiver according to claim 1 wherein the receiver does not include a laser.

4. The optical receiver according to claim 1 wherein the pilot generator comprises a controller that is configured to detect a difference between powers of the first and second reconstructed pilot signals and to send a feedback signal that reduces the difference.

5. The optical receiver according to claim 4 wherein the pilot generator comprises a pair of phase modulators followed by a coupler; wherein the feedback signal is configured to change a phase shift between the pair of phase modulators in response to the difference between powers of the first and second reconstructed pilot signals.

6. The optical receiver according to claim 1 wherein the pilot generator is a partial Mach Zehnder Modulator that comprises a pair of phase modulators followed by a coupler.

7. The optical receiver according to claim 6 wherein the pair of phase modulators are configured to operate in a push pull mode.

8. The optical receiver according to claim 1 wherein the extraction circuit comprises a polarized de-multiplexer followed by a first filter bank and a second filter bank;
   wherein a first filter of the first filter bank is configured to output the first polarized data and a second filter of the first filter bank is configured to output the first polarized pilot component; and
   wherein a first filter of the second filter bank is configured to output the second polarized data and a second filter of the second filter bank is configured to output the second polarized pilot component.

9. The optical receiver according to claim 1 wherein the first and second data streams are in phase and quadrature data streams.

10. The optical receiver according to claim 1 wherein the first and second polarizations are orthogonal to each other.

11. The optical receiver according to claim 1 wherein the frequency gap is positioned at a center of the data spectrum.

12. The optical receiver according to claim 1 wherein the first and second coherent detectors are homodyne receiver detectors.

13. The optical receiver according to claim 1 wherein the first and second coherent detectors are heterodyne receiver detectors.

14. An optical transceiver that comprises an optical receiver and an optical transmitter;
   wherein the optical receiver the comprises an extraction circuit, a pilot generator, a first coherent detector and a second coherent detector;
   wherein the extraction circuit is configured to (a) receive, from an optical communication link, received signals that comprise first polarized data, second polarized data, a first polarized pilot component, and a second polarized pilot component and (b) extract the first and second polarized pilot components, the first polarized data and the second polarized data;
   wherein the first and second polarized pilot components belong to a pilot signal that has a pilot frequency that is within a frequency gap formed in a data spectrum that comprises frequencies of the first and second polarized data;
   wherein the first polarized data and the first polarized pilot components are polarized by a first polarization and wherein the second polarized data and the second polarized pilot components are polarized by a second polarization that differs from the first polarization;
   wherein the pilot generator is configured to coherently sum the first and second polarized pilot components and to generate first and second reconstructed pilot signals of substantially a same power;
   wherein the first coherent detector is configured to receive a first portion of the first reconstructed pilot signal and the first polarized data and to output first and second data streams that form the first polarized data;
   wherein the second coherent detector is configured to receive a first portion of the second reconstructed pilot signal and the second polarized data and to output first and second data streams that form the second polarized data;
   wherein the optical transmitter is configured to receive four data streams, a second portion of the first reconstructed pilot signal and a second portion of the second reconstructed pilot signal and to output an output signal that represents the four data streams.

15. A method for self-coherent reception, the method comprises;
- receiving, by an extraction circuit and from an optical communication link, received signals that comprise first polarized data, second polarized data, a first polarized pilot component, and a second polarized pilot component;
- extracting, by the extraction circuit, the first and second polarized pilot components, the first polarized data and the second polarized data;
- wherein the first and second polarized pilot components belong to a pilot signal that has a pilot frequency that is within a frequency gap formed in a data spectrum that comprises frequencies of the first and second polarized data;
- wherein the first polarized data and the first polarized pilot components are polarized by a first polarization and wherein the second polarized data and the second polarized pilot components are polarized by a second polarization that differs from the first polarization;
- coherently summing, by a pilot generator, the first and second polarized pilot components and generating first and second reconstructed pilot signals of substantially a same power;
- receiving, by a first coherent detector, at least a first portion of the first reconstructed pilot signal and the first polarized data;
- outputting, by the first coherent detector and in response to the at least first portion of the first reconstructed pilot signal and the first polarized data, at least one first data stream;
- receiving, by a second coherent detector, at least a first portion of the second reconstructed pilot signal and the second polarized data;
- outputting, by the second coherent detector and in response to the at least first portion of the second reconstructed pilot signal and the second polarized data, at least one second data stream.

16. The method according to claim 15, comprising generating an output signal of a transmitter in response to four data streams and second portions of the first and second reconstructed pilot signals.

* * * * *